United States Patent
Fernández Falces et al.

(10) Patent No.: US 9,920,538 B2
(45) Date of Patent: Mar. 20, 2018

(54) PRECAST SEGMENT FOR WIND TURBINE TOWER AND METHOD FOR BUILDING A WIND TURBINE TOWER USING SAID PRECAST SEGMENT

(71) Applicant: ACCIONA WINDPOWER S.A, Navarra (ES)

(72) Inventors: Sara Fernández Falces, Navarra (ES); Iván García Maestre, Navarra (ES); Imanol Otero Landa, Navarra (ES); Teresa Arlabán Gabeiras, Navarra (ES); José Luis Arístegui Lantero, Navarra (ES); Ricardo Royo García, Navarra (ES); Jose Miguel García Sayés, Navarra (ES); Miguel Núñez Polo, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 151 days.

(21) Appl. No.: 14/323,844

(22) Filed: Jul. 3, 2014

(65) Prior Publication Data
US 2015/0020467 A1 Jan. 22, 2015

(30) Foreign Application Priority Data

Jul. 5, 2013 (ES) .................................. 201331008

(51) Int. Cl.
*E04H 12/00* (2006.01)
*E04F 17/08* (2006.01)
(Continued)

(52) U.S. Cl.
CPC ............. *E04F 17/08* (2013.01); *E04H 12/12* (2013.01); *E04H 12/34* (2013.01); *F03D 13/10* (2016.05);
(Continued)

(58) Field of Classification Search
CPC ... E04B 5/023; E04B 1/06; E04B 1/22; E04C 3/10; E04C 3/26; E04C 5/08; E04H 12/16
(Continued)

(56) References Cited

U.S. PATENT DOCUMENTS 2,929,236 A * 3/1960 Steward et al. ............. 52/223.3
4,903,450 A * 2/1990 Adams ........................ 52/293.2
(Continued)

FOREIGN PATENT DOCUMENTS

CN 201733461 2/2011
EP 1466095 1/2008
(Continued)

OTHER PUBLICATIONS

Informe Previo De Patentabilidad; "Sistema De Calentamiento De Juntas De Torres De Hormigon Con Cable Radiante"; Solicitanta: Acciona Windpower; Fecha: May 20, 2013: 28 pages.
(Continued)

*Primary Examiner* — Charles A Fox
*Assistant Examiner* — James J Buckle, Jr.
(74) *Attorney, Agent, or Firm* — Womble Bond Dickinson (US) LLP

(57) ABSTRACT

Precast segment for wind turbine tower especially designed to be used in wind turbine towers installed in cold climates, and which comprises joint flanges showing a configuration intended to establish the boundaries for forming the joints between said precast segment and an adjacent precast segment and which comprises conduits provided with an inlet and an outlet, situated in the proximity of the joint flanges of the precast segment intended to house some heating cables that generate heat. The method comprises the use of the described precast segment and the stages of introducing heating cables in the conduits of the precast segment, applying current to said cables and removing the cables
(Continued)

when a filler material used in the joint between precast segments has set.

15 Claims, 4 Drawing Sheets

(51) Int. Cl.
| | | |
|---|---|---|
| *E04H 12/12* | (2006.01) | |
| *E04H 12/34* | (2006.01) | |
| *F03D 13/20* | (2016.01) | |
| *F03D 13/10* | (2016.01) | |

(52) U.S. Cl.
CPC .......... *F03D 13/20* (2016.05); *F05B 2230/41* (2013.01); *F05B 2230/60* (2013.01); *F05B 2240/912* (2013.01); *F05B 2260/30* (2013.01); *F05B 2280/701* (2013.01); *F05B 2280/702* (2013.01); *Y02E 10/728* (2013.01); *Y02P 70/523* (2015.11)

(58) Field of Classification Search
USPC ..... 52/40, 223.5, 293.2, 295, 296, 504, 574, 52/576, 587.1, 607, 608, 609, 848
See application file for complete search history.

(56) References Cited

U.S. PATENT DOCUMENTS

| | | | |
|---|---|---|---|
| 5,465,541 A * | 11/1995 | Lin et al. | 52/220.2 |
| 8,490,337 B2 * | 7/2013 | Word et al. | 52/40 |
| 8,621,790 B2 * | 1/2014 | Lekhtman | 52/167.1 |
| 8,640,407 B2 * | 2/2014 | Alsayed | E04B 2/54 52/220.1 |
| 2007/0020974 A1 * | 1/2007 | Carlson | G06Q 30/00 439/105 |
| 2012/0141295 A1 | 6/2012 | Castaneda et al. | |

FOREIGN PATENT DOCUMENTS

| | | |
|---|---|---|
| JP | 2011032843 | 2/2011 |
| KR | 100821268 | 4/2008 |
| KR | 20090024906 | 3/2009 |
| KR | 20100131780 | 12/2010 |

OTHER PUBLICATIONS

Informe Ingenieria; Sistema De Calentamiento De Juntas De Torres De Hormigon Con Cable Radiante; 2011; 9 pages.

* cited by examiner

DIBUJOS

PRECAST SEGMENT FOR WIND TURBINE TOWER AND METHOD FOR BUILDING A WIND TURBINE TOWER USING SAID PRECAST SEGMENT

The present application is a non-provisional application claiming priority from Spanish Patent No. 201331008 filed Jul. 5, 2014.

OBJECT OF THE INVENTION

The present invention can be included in the technical field of precast segments for wind turbine towers and more specifically for wind turbine towers in cold climates, where ambient temperature is below 5° C. At the same time, the invention comprises the method for manufacturing a wind turbine tower using the described precast segment.

BACKGROUND OF THE INVENTION

The objective of wind energy is to generate electricity from the wind using wind turbines at maximum possible efficiency and minimum cost. Said wind turbines basically consist of a tower, a nacelle which contains the electrical generator,
and a rotor comprising at least two blades.

The tower supports all the elements incorporated in the nacelle and transmits to the foundations all the reaction forces generated as a consequence of the wind turbine's different aerodynamic actions and operating conditions.

Generally, given the dimensions of the wind turbine and consequently, of the tower, the latter is manufactured using modular sections of reinforced concrete called precast segments. To join these precast segments it is necessary to use a filler material, which may consist of mortar (also called grout) or a resin, deposited in them.

From now onwards the invention will be explained making reference to the use of mortar as filler, although it could be, as mentioned, resin or another material.

During the assembly of concrete towers at low temperatures it is necessary to guarantee minimum temperature conditions (at least 5° C.) for both the precast segments and the mortar before pouring the mortar, including the temperature of the mortar poured into the vertical and horizontal joints, to guarantee adequate curing so that the mortar can develop all its mechanical properties (resistance).

When these assemblies are made at low temperatures, where the temperature can drop to −20° C., in order to ensure a correct structural behaviour of the towers, it is necessary to have a heating system that allows the temperature to be maintained above 5° C. in both the precast segments and the mortar poured into the joints.

Pouring mortar at ambient temperatures below 0° C. is always a fairly restrictive conditioning factor. This is due to the fact that concrete requires a certain temperature for the cement to hydrate and acquire resistance. Also, because it contains water, there is a risk that when it starts to set, free-running water freezes increasing its volume, with the ensuing danger of cracking.

In the case of assembling concrete towers at low temperature, the volume of mortar is insufficient to guarantee that the water will not freeze, as it is totally surrounded by a large mass of prefabricated concrete which is at ambient temperature.

In low temperature conditions (below 5° C.) in addition to ensuring the mechanical properties of the mortar, it is necessary to guarantee the perfect filling of the joints between the precast segments that make up the tower.

To this effect, it must be feasible to pump said mortar to a height of 20 m with no segregation occurring upon pouring it from a height of 20 meters in free fall, in the case of vertical joints. Horizontal joints are even more restrictive as in this case, the pouring of the mortar must be guaranteed at heights above 100 m. It is required for all mortars, according to their technical datasheet, that the temperature of the support (in the case of towers for wind turbines these are the precast segments) is at a temperature of at least +5° C. to guarantee correct curing. Below 5° C. manufacturers do not guarantee the necessary minimum resistances.

Traditionally, in the closest prior art, foundations are made at −20° C. using concrete with high cement content so that it has a high heat of hydration and heats up quick enough to avoid freezing. Generally, footings are covered with thermal blankets so as not to lose too much heat and in this way maintain the temperature at the required values.

The problem with using thermal blankets is that they need to adhere well to the surfaces that require heating. If said blankets are not well-adhered, the heating of the surfaces is slow and non-homogeneous.

Another possibility for heating consists of using fans with an electrical resistance (cylindrical conduits with directional air outlet nozzles) directed towards the joints. Some of the problems that arise with this solution are that a high number of fans is necessary, making it necessary to have a high number of generators to supply energy to the fans, and that a certain assurance of continuous system operation is necessary as a stoppage would entail the rapid loss of the thermal conditions previously generated.

Other alternatives considered in the pre-heating are the use of infrared lamps. The market solutions do not achieve effective results where heating is concerned.

The current technique for pouring mortar presents four clear drawbacks, among which one would highlight the problems with cracking due to freezing of the water present, quality problems in the formation of the joints, filling problems (especially in horizontal joints at heights that are distant from the ground), and problems with the resistance capacity of the mortar when the temperature reached is below 5° C., problems with assembly in relation to both times and means employed (difficulty with pumping, heating of the nearby medium where the mortar is deposited . . . etc.), and the need to use special mortars with a high content in cement with the ensuing increase in the expensiveness of the tower.

The heating system known in the state of the art designed to the thermal conditioning of the materials to resolve the problems described above present a high consumption due to low thermal efficiency.

DESCRIPTION OF THE INVENTION

The present invention describes a precast segment for wind turbine towers and a method for manufacturing wind turbine towers using said precast segment. The proposed precast segment and manufacturing method help to resolve the problem of curing the filler material in the vertical and horizontal joints of constructive structures in cold climates wherein the ambient temperature is below 5° C. More specifically, both the design of the precast segment and the method described allow the use of an optimal heating system of the precast segments in the zone close to the joints between precast segments. Likewise, they allow adequate setting of the filler material deposited between the vertical and horizontal joints of the precast segments used in the wind turbine tower. One additional advantage of the proposed precast segment and method is that after being used in a precast segment, the heating system can be reused for the thermal conditioning of another precast segment.

The precast segment of the present invention is designed to be used in wind turbine towers and comprises at least one joint flange which shows a configuration designed to establish a boundary to form at least one joint between adjacent precast segments using a filler material that can be mortar or resin.

To be able to be used in wind turbine towers that are installed in zones with cold climates, the proposed precast segment comprises conduits located in the vicinity of the joint flanges which are designed to house heating cables. When a current passes through said heating cables, heat is generated.

Said conduits may be coated to enable a more simple introduction and extraction of the heating cables which are introduced into them to increase the temperature in that zone of the precast segment during manufacturing of the wind turbine tower. In one preferred embodiment, the coating comprises at least one layer of lubricant material allowing the heating cables to slide easily inside the conduits.

Therefore, the conduits of the precast segment are designed to allow the passage of heating cables which help to heat the joint flanges of the precast segment that form the joints with the adjacent precast segments. They also help to heat the mortar that is poured into the joints to maintain the joint between the adjacent precast segments. This makes it possible to use the described precast segments in wind turbine towers installed in cold climate areas. When the mortar of the joint has acquired a sufficient degree of setting (understood as the level of setting at which the mortar has the necessary minimum mechanical resistance capacity for the joint that encloses it), the heating cables can be extracted from the inside of the conduit and introduced in the conduits of other precast segments to carry out the same operation.

In one preferred embodiment of the invention, the heating cables are housed inside the conduits and are part of the precast segment. Said heating cables may also be coated in a lubricant material to facilitate introduction thereof into the conduits. It may be the case that both the heating cables and the inside of the conduits comprise a lubricant coating. Also, the conduits may be pipes made of a material with a high thermal conductivity.

A method for manufacturing wind turbine towers using the precast segments like the one of the invention which incorporates at least one heating cable inside the conduits is also described.

To carry out the method, the precast segments are laid out adjacent to each other, forming a joint between precast segments. Once the precast segments have been assembled with the heating cables already inside them, an electrical current is made to flow through said heating cables and the filler material is poured into the joint while the joint flanges of the precast segments remain hot through the action of the heating cables. The filler material is preferably mortar or resin. In this way, correct setting of the filler material is ensured even in cold climates with low ambient temperatures. The placement of the heating cables in the conduits in proximity to the joint flanges of the precast segments, around the joints, allows the local areas into which the mortar will be poured to be heated in an optimal manner.

When the mortar has acquired sufficient setting the heating cables are removed from the conduits. These same heating cables can be used to manufacture other constructive structures, thereby reducing the costs of manufacturing said structures as it is not necessary to buy new heating cables for each new constructive structure.

Another option considered in the present invention is that the heating cables remain embedded in the precast segment. In this case, it is necessary that the precast segments of the constructive structure are manufactured with reinforcements inside, in other words, with reinforcing steel inside. In this case, internally in the precast segment, the heating cables are joined to the reinforcements. The heating cables remain embedded in the precast segment.

When the heating cables are placed directly joined to the reinforcements of the precast segments a large number of cable fixing points are necessary. This is due to the fact that the heating cables are deformable and it must be guaranteed that the distance to the joint flange that forms the joint is substantially the same throughout the entire flange of the joint to guarantee that all the mortar that is poured into the joint sets under the same conditions.

The present invention guarantees a fast and simple positioning of the heating cables with respect to the joint thanks to the construction of the conduits in the precast segments. Said conduits do not comprise right angles to facilitate the insertion and removal of the heating cables.

The conduits into which the heating cables are inserted have a high thermal conductivity and may be placed taking advantage of the reinforcements in the precast segments, by joining the cables to them if the precast segment has reinforcements, or by building the conduits when the formwork operation of the precast segments is performed.

In one embodiment of the invention wherein the conduit is a pipe with a high mechanical resistance, and more specifically a metal pipe, which is left embedded in the concrete, said conduit can comprise fins on the outside to maximise the contact surface with the concrete.

The wind turbine tower formed with the precast segments of the invention and following the described method have all the vertical and horizontal joints joined together using mortar. The method used to form them allows minimum temperature conditions (5° C.) to be guaranteed in both the joint flanges of the precast segments before pouring the mortar and the mortar poured into the joints. This ensures adequate curing and the mortar can develop all its mechanical (resistance) properties. This is essential in wind turbine towers which have to withstand very high stresses due to the fact that they are always installed in zones with strong gusts of wind and that the action of the wind on the wind turbine blades carries strong forces through the tower.

DESCRIPTION OF THE DRAWINGS

To complement the description and with a view to contributing to a better understanding of the characteristics of the invention in accordance with a preferred example of a practical embodiment thereof, a set of drawings is attached as an integral part of said description wherein, by way of illustration and not limitation, the following has been represented.

PREFERRED EMBODIMENT OF THE INVENTION

Figure 1A:
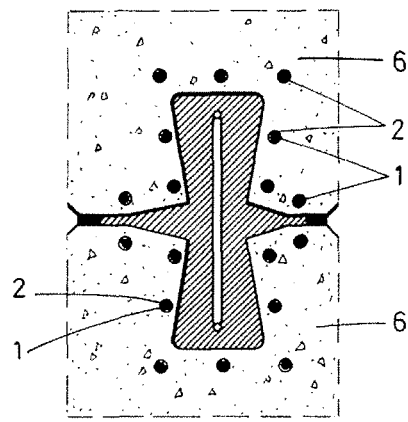
FIG. 1a.—Shows a close-up plan view of a vertical joint formed between two adjacent precast segments.
Figure 1B:
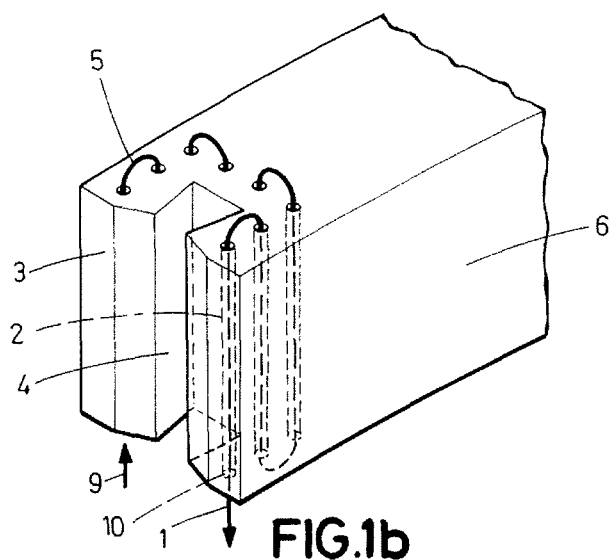
FIG. 1b.—Shows a view of one of the precast segments which appears in FIG. 1a wherein the conduits can be seen placed in one of its vertical joint flanges.

The present invention describes a precast segment for wind turbine towers installed in zones with cold climates and a method for manufacturing wind turbine towers using said precast segment. The objective of the invention is to allow local heating of the precast segments of the wind turbine tower in the zones of interest to allow a correct setting of the mortar or cement that is poured into the joints between precast segments.

In particular, the invention is especially advantageous in the case of concrete towers, normally built using precast segments made of concrete and a metal reinforcement inside consisting of interwoven steel rods, commonly referred to as reinforcements.

The precast segment of the present invention comprises at least one joint flange (3) which shows a configuration designed to establish a limit to form the at least one joint (4) between said precast segment and a contiguous precast segment using a filler material. The most important characteristic of the proposed precast segment is that it comprises conduits (2) provided with an inlet (9) and an outlet (10), situated in the proximity of the joint flanges (3) and which are designed to house some heating cables (1).

The heating cables are designed to generate heat when an electrical current is made to pass through them.

Said heating cables (1) can form part or not of the precast segment itself and are introduced into the conduits (2) through the inlet (9) and removed through the outlet (10). To facilitate these operations, the conduit (2), the heating cables (1) or both may have a coating (7). Additionally, said coating may comprise at least one layer of a lubricant material (7).

Figure 5A:
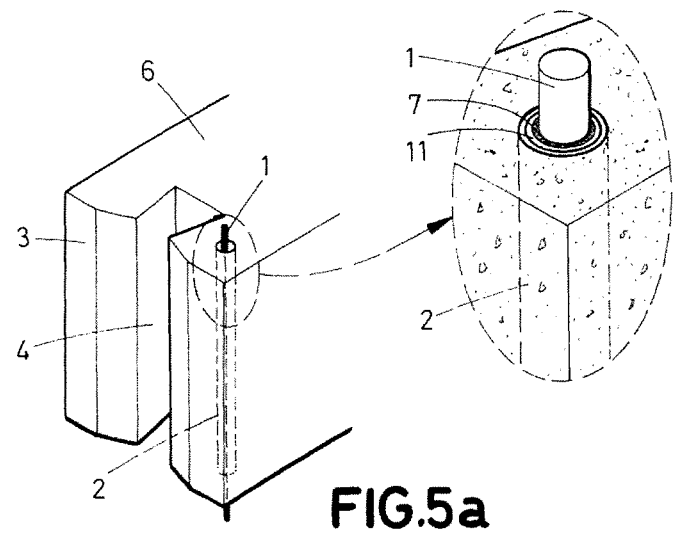
FIG. 5a.—Shows a view of a precast segment with conduits in its vertical flange and a close-up view in which the pipe that forms the conduit, the lubricant material and the heating cable can be appreciated.
Figure 5B:
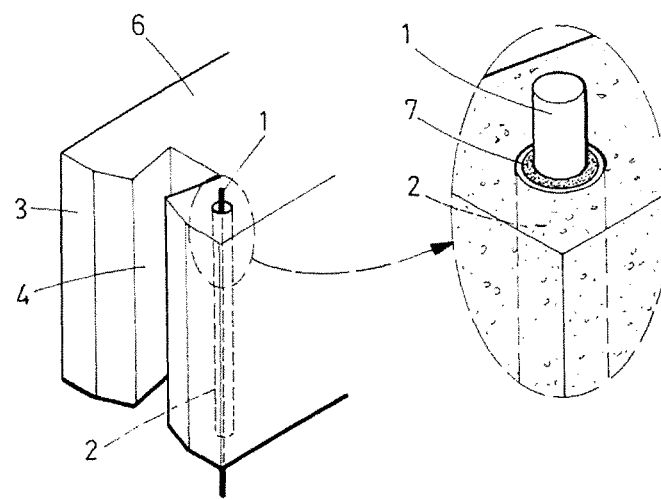
FIG. 5b.—Shows a view of a precast segment with conduits on its vertical flange as in FIG. 5a but in this one the pipe has been removed.

In one embodiment which can be appreciated in FIG. 5.b, the conduits (2) are defined by the concrete itself of the precast segments, and have been left formed in the manufacture of the precast segments by means of the use of inserts.

In one alternative embodiment, the conduits (2) may be pipes (11) of a material with a high structural resistance such as steel for example, which are left embedded in the concrete of the precast segment. In this case, in addition to acting as a housing and guide for the heating cables, they would act as a structural reinforcement of the precast segment itself.

In another embodiment, the conduits (2) are pipes made of a material with a low structural resistance in which case they act only as a housing and a guide.

In addition, the pipes (11) may be made of a material with a high thermal conductivity to boost the effect of the heat that is generated in the heating cables (1) when an electrical current is applied to them. In one preferred embodiment, the conduits (2) comprise on their outer surface a series of fins (12) designed to increase their thermal conductivity.

To manufacture the precast segments the reinforcements are disposed on a mould that is covered with a countermould for subsequently pouring the concrete. In one embodiment, the conduits (2) are formed with inserts. Said inserts are disposed joined to the reinforcements of the precast segment by means of joining elements which are left embedded in it once the concrete has set. Either the inserts or the joining elements or both are rigid, to allow better control of their position with respect to the surfaces of the mould which will define the flanges of the precast segment. This guarantees that the distance from the heating cables to the flanges of the precast segment is always the same.

In the embodiment wherein the conduits (2) are steel pipes (11), these are disposed interwoven with the reinforcements before pouring of the concrete to manufacture the precast segments, in such a way that they form part of said reinforcements. This embodiment is especially advantageous from the point of view of the positioning of the conduits and resistance they confer on the precast segments. Also, their manufacture is simpler, as it is not necessary to carry out any subsequent unmoulding operation as in the case of the previous alternative.

In specific embodiments wherein the precast segments have one of their joint flanges closed, the conduits (2) are blind and the inlet (9) coincides with the outlet (10).

In one embodiment of the invention that works with vertical joints, the conduits (2) are built in a vertical direction, parallel to the vertical joint flange (3) of the precast segment (6). In another embodiment that works with horizontal joints, the conduits (2) are built in a horizontal direction, parallel to a horizontal joint flange (3) of the precast segment (6).

In another embodiment, the conduits (2) are built with the same curvature as the precast segment (6) and with a radial portion (8) at its ends designed to facilitate the introduction of the heating cable (1) into the conduit (2) through the inlet hole (9). In this case, the radial portion (8) of the conduits (2) comprises an elbow joint having a curvature large enough to facilitate the insertion and removal of the heating cable (1).

Likewise, an object of the present invention is a method for manufacturing a wind turbine tower using the precast segments described above which allow working even when the ambient temperature is below 5° C. This is a simple manufacturing method which does not make more expensive the wind turbine concrete towers that are manufactured with it. Heating cables are used to heat the area of the joint between precast segments and allows said heating cables to be placed quickly and easily with respect to the joint of the precast segments.

The proposed method for manufacturing wind turbine towers comprises the use of precast segments such as the ones described above which incorporate at least one heating cable (1) inside the conduits (2). The method comprises a step of disposing the precast segments (6) adjacent to each other, in such a way that a joint (4) is formed between precast segments. Subsequently, an electrical current is made to flow through the heating cables (1), pouring a filler material into the joint between precast segments (6), and finally to remove the heating cables (1) from the conduits (2) through the outlet (10) of the conduits (2), once it has acquired a sufficient degree of setting.

The stage of applying current to heat the precast segments (6) before pouring the filler material is carried out during sufficient time for the precast segments (6) to reach a temperature of more than 5° C. After pouring the filler material, the current continues to be applied to the heating cables until the filler material of the joint has acquired a sufficient degree of setting (understood the level of setting at which the filler material has a necessary minimum mechanical resistance capacity for the joint that encloses it). The time required for this will depend on at least the ambient temperature and the type of filler material. In the proposed method the minimum time for which it is necessary to apply current after pouring the filler material is characterised in dependence with the filler material employed. This time may be several hours, and may even exceed 24 hours when the filler material employed is mortar.

The method described in the present invention may comprise an additional stage of placing connectors (5) between the ends of different heating cables (1) that are located in the conduits (2) to allow the flow of current between said heating cables (1) and carry out the connection to a power supply box for said heating cables (1). When a heating cable (1) is placed in each conduit (2) it is possible to use these connectors (5) to establish the electrical connections between the heating cables (1) in such a way that the current is conducted between the heating cables (1) to reduce the number of connections to the power equipment.

Thanks to the conduits (2) built inside the precast segments (6), the placing of the heating cables (1) with respect to the joint flanges (3) which form the joints (4) is done quickly and easily. It is only necessary to introduce the heating cables (1) through the inside of said conduits and when they have already been used to heat the mortar poured into the joints (4) and these have already set correctly, the heating cables (1) are extracted from the conduits (2). Therefore, the same heating cables (1) can be used in the manufacture of several wind turbine towers which helps to reduce manufacturing costs.

It must be taken into account that the conduits (2) must be free of right angles as otherwise, introduction and extraction of the heating cable (1) is more complex.

In one preferred embodiment, the conduits located close to the flanges that define the vertical joints are blind and the inlet (9) and outlet (10) coincide such that insertion and removal of the cables is done through just one point. Preferably, the conduits are blind and straight, without changes in direction. In this way, the stage of insertion is even easier. In another embodiment, the inlet and outlet of the conduits (2) close to the flanges that define the vertical joints are through-holes. In this way, not only extraction of the heating cables is made easier, but also their insertion in another precast segment for subsequent use thereof.

For the described manufacturing method it may be necessary to use connectors (5) to drive current to each heating cable (1) from power supply equipment.

Generally, the precast segments (6) used in the method for manufacturing wind turbine towers made of concrete have reinforcements inside. In these cases, the method comprises a stage of joining the pipes for manufacturing the conduits to the reinforcements.

When using pipes with a high structural resistance they are preferably embedded in the precast segment and act as a structural reinforcement of the precast segment (6) as well as being the conduits (2) intended to receive the heating cables (1). In a preferred embodiment, the pipes of a high structural resistance are made of metal, preferably steel.

Likewise, the pipes may be made of material with a low structural resistance, such as plastic for example. The difference with respect to the preceding embodiment is that in this case the conduits (2) do not act as a structural reinforcement, their only function is to allow passage and guiding of the heating cables (1) through them, however, because they are low cost and are embedded in the concrete they constitute an efficient option for the heating system.

In another embodiment of the invention, the inserts used for the construction of the conduits (2) are coated with a lubricant material and the method comprises a stage of removing the conduit (2) from the interior of the precast segment (6).

These inserts are placed before pouring the mortar and simply removed after the mortar has set thanks to the lubricant material. This embodiment entails a lower requirement of material for the placing of the heating cables as the inserts which are used to form the conduits (2) can be reused in several towers and/or precast segments.

Figure 2A:
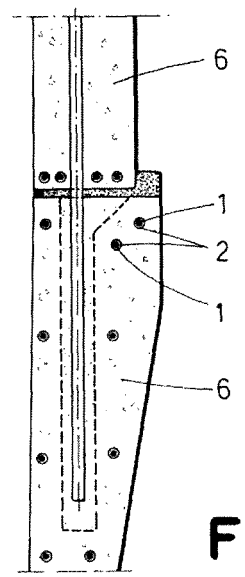
FIG. 2a.—Shows a view of a horizontal joint formed between two adjacent precast segments.
Figure 2B:
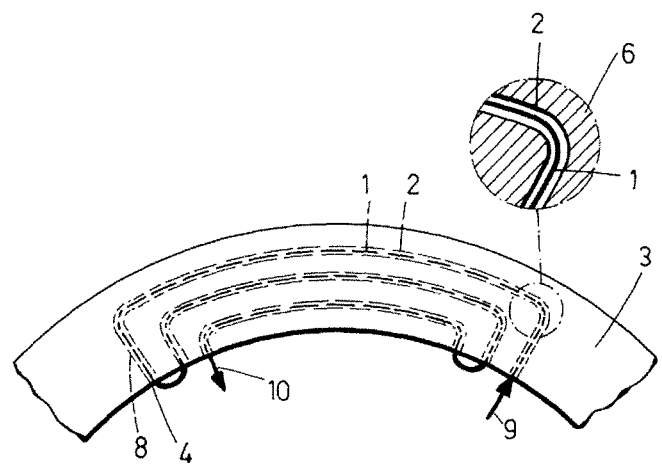
FIG. 2b.—Shows a plan view of one of the precast segments that appears in FIG. 2a with the conduits placed in one of its horizontal joint flanges.

When the manufacturing method is used to manufacture wind turbine towers which have vertical joints, the conduits (2) are built in a vertical direction, parallel to a vertical joint flange (3) of the precast segment (6). This example is illustrated in FIG. 2. In this specific case, a vertical joint can be appreciated in the end of one precast segment. Said joint is surrounded by a plurality of conduits (2) where the heating cable (1) is introduced.

Figure 3:
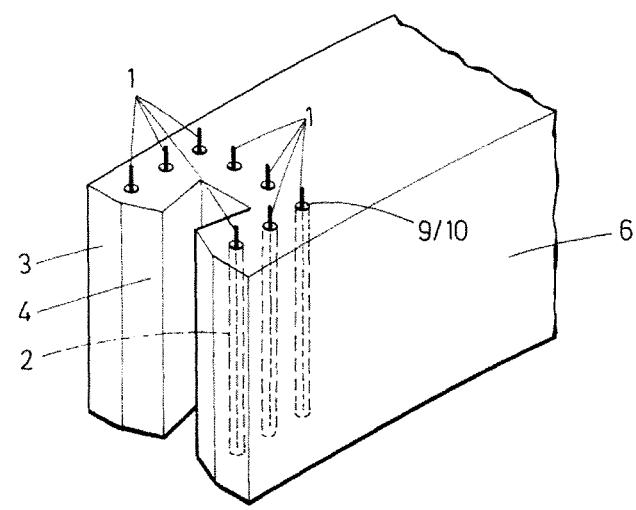
FIG. 3.—Shows a view of a precast segment with blind conduits wherein the inlet and the outlet coincide and are placed in one of the vertical joint flanges of the precast segment.
Figure 4:
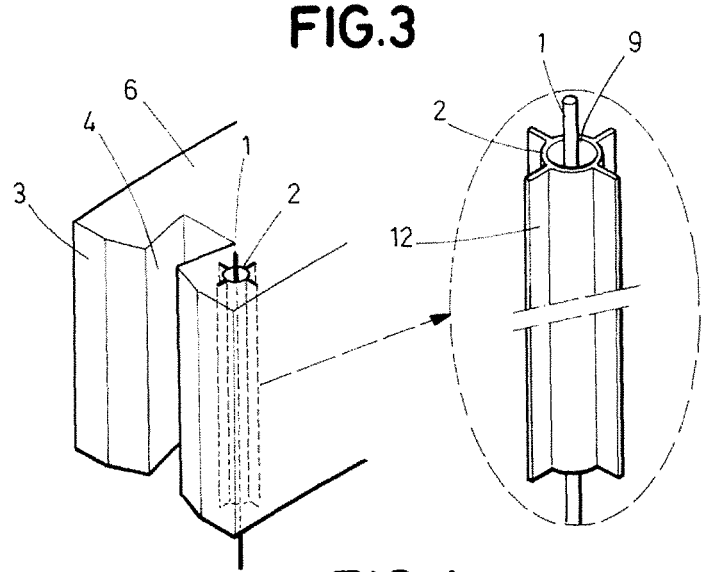
FIG. 4.—Shows a view of a precast segment with a close-up of a conduit formed by a pipe with fins to increase the thermal conductivity embedded in the concrete.

When the method is used to manufacture wind turbine towers which have horizontal joints, the conduits (2) are built in a horizontal direction, parallel to a horizontal joint flange (3) of the precast segment (6). This embodiment is represented in FIG. 3.

Additionally, when two precast segments (6) are being joined with horizontal joints, the conduits (2) are built with the same curvature as the precast segment (6) and with a radial portion (8) at its ends intended to facilitate the introduction of the heating cable (1) into the conduit (2). This can also be appreciated in FIG. 3.

The insertion of the heating cable (1) in the conduit (2) is performed using a lubricant material (7) which facilitates said insertion.

Likewise the method can comprise some final stages of removing the heating cable (1) from the conduit (2) of a precast segment (6) and subsequently introducing said heating cable (1) into the conduit (2) of another precast segment (6).

The invention claimed is:

1. A precast segment for wind turbine tower which comprises at least one joint flange configured to establish a boundary to the formation of at least one joint between said precast segment and an adjacent precast segment, where the joint is to be filled with filler material, wherein the precast segment comprises at least one conduit and:
   the conduit comprises one inlet and one outlet,
   the conduit is located in the vicinity of the at least one joint flange of the precast segment, and
   the conduit has a cross section of a similar shape and size to that of the cross section of a heating cable so as to house the heating cable;
   and wherein the longitudinal direction of the conduits is parallel to the joint flange of the precast segment and the conduits are built with the same curvature as the precast segment and with a radial portion at its ends designed to facilitate the introduction of the heating cable in the conduit through the inlet hole, and the radial portion of the conduits comprises an elbow joint having a curvature large enough to facilitate the insertion and removal of the heating cable.

2. The precast segment of claim 1 wherein the inside of the at least one conduit houses a heating cable.

3. The precast segment of claim 1 wherein the conduit has a coating intended to facilitate the insertion and removal of a heating cable in the conduit.

4. The precast segment of claim 3 wherein the coating of the conduit comprises at least one layer of lubricant material.

5. The precast segment of claim 1 wherein it is made of reinforced concrete and the surfaces which delimit the at least one conduit are made of concrete.

6. The precast segment of claim 1 wherein it is made of reinforced concrete and the at least one conduit is formed by a pipe made of a material with a high thermal conductivity embedded in the concrete of the precast segment.

7. The precast segment of claim 1 wherein the precast segments comprise reinforcements inside and the conduits are joined to said reinforcements.

8. The precast segment of claim 1 wherein the precast segments comprise reinforcements in their interior and the conduits are made of metal and form part of said reinforcements.

9. The precast segment of claim 1 wherein the conduits are blind and the inlet and the outlet coincide.

10. A method for manufacturing a wind turbine tower using precast segments for wind turbine towers wherein the precast segments comprise:
    at least one joint flange configured to establish a boundary to the formation of at least one joint between said precast segment and an adjacent precast segment using a filler material,
    at least one conduit provided with one inlet and one outlet, located in the vicinity of the at least one joint flange of the precast segment intended to house a heating cable and at least one heating cable located inside the conduits, wherein the method comprises the following stages:
    disposing the precast segments adjacent to each other, in such a way that a joint is formed between precast segments,
    making an electrical current flow through the heating cables,
    pouring a filler material into the joint between precast segments,
    removing the heating cables from the conduits through the outlet of the conduits, once the filler material has acquired a sufficient degree of setting.

11. The method of claim 10 wherein it comprises a stage of placing connectors between the ends of the heating cables that are in the conduits allowing the flow of electrical current between said heating cables.

12. The method of claim 10 wherein the conduits used are coated in a lubricant material and the method comprises a stage of removing the conduit from the inside of the precast segment.

13. The method of claim 10 wherein the insertion of the heating cable into the conduit is performed using a lubricant material which facilitates said insertion.

14. The method of claim 10 wherein the method comprises a stage of removing the heating cable from the conduit of one precast segment and a subsequent stage of inserting said heating cable into the conduit of another precast segment.

15. The precast segment of claim 1 wherein the cross section of the conduit and the cross section of the heating cable are circular and wherein the diameter of the cross section of the conduit is slightly greater than the diameter of the cross section of the heating cable.

\* \* \* \* \*